Aug. 16, 1927.  
W. A. HALL  
1,639,035  
COMBINED CASKET, SKID, AND DOLLY  
Filed Sept. 21, 1925  2 Sheets-Sheet 1

Witnesses:  
William P. Kilroy  
Harry R. L. White

Inventor:  
William A. Hall  
By Edward Fay Wilson  
Atty.

Aug. 16, 1927.  
W. A. HALL  
1,639,035  
COMBINED CASKET, SKID, AND DOLLY  
Filed Sept. 21, 1925  
2 Sheets-Sheet 2

Witnesses:
William P. Kilroy
Harry R. White

Inventor:
William A. Hall
Edward Fay Wilson
Atty

Patented Aug. 16, 1927.

1,639,035

UNITED STATES PATENT OFFICE.

WILLIAM A. HALL, OF CHICAGO, ILLINOIS.

COMBINED CASKET, SKID, AND DOLLY.

Application filed September 21, 1925. Serial No. 57,662.

My invention relates to an improved means for readily moving a burial casket about and is especially adapted for moving a casket from an upper story of a house down through the stairways and through the hallways.

The object of my invention is to provide a device for the purpose mentioned which shall combine the features of a wheeled truck or dolly and a pair of skids, and upon which a casket can be readily secured and easily moved about and readily moved down stairs and through narrow winding passages.

My invention will be more readily understood by reference to the accompanying drawings in which:—

Figure 1:
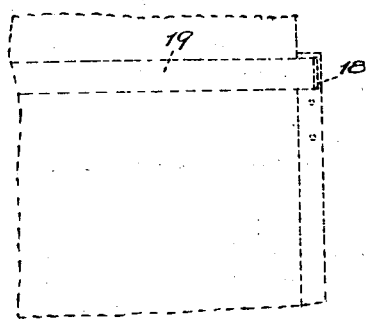
Figure 1, is a fragmentary side elevation of the device showing a casket thereon in dotted lines.
Figure 1:
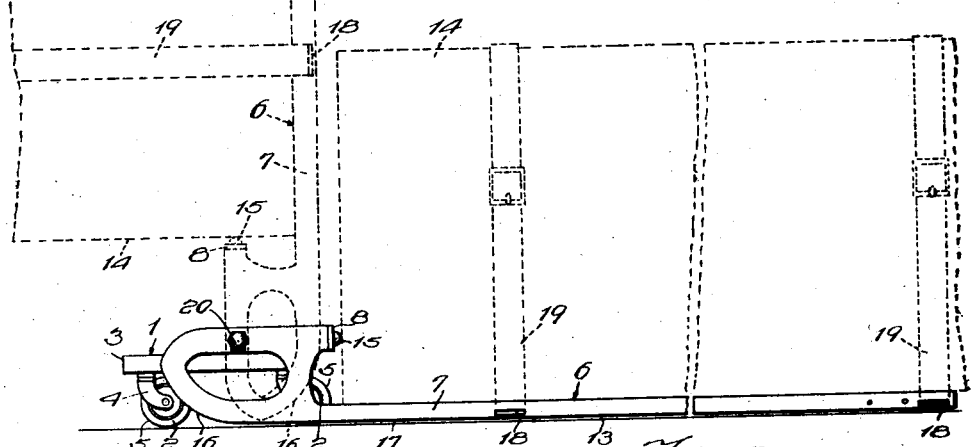
Figure 2:
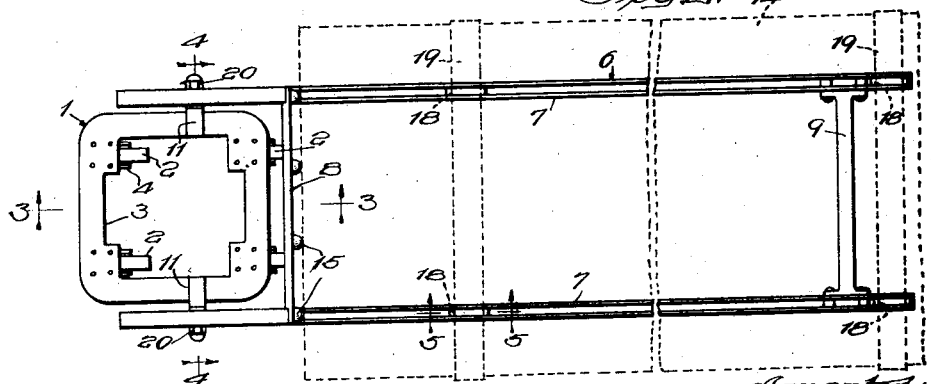
Figure 2, is a fragmentary top plan view of the device.

In said drawings 1 represents generally a truck or dolly having four castor wheels 2. The truck has a light openwork platform comprising a substantially rectangular frame 3 of channel shaped section for strength and to which the castors 2 are secured.

The castor wheels are carried in fork frames 4 which are pivotally mounted to swing around horizontally on the forward and rear bars of the frame 1, set in slightly from the side bars thereof. The wheels preferably have rubber rims or tires 5 in order to eliminate all noise and jar.

For receiving and carrying the casket I provide a framework 6 in the form of a pair of skids 7, spread apart to straddle the dolly and rigidly connected together by a cross-brace 8, near their forward ends, and a second cross-brace 9, near their rear ends. These skids simulate the runners of a sled and the frame 6, formed of the skids and the cross-braces, is pivotally mounted at its forward end upon the dolly, and is adapted to be swung from horizontal position, shown in full lines, Figure 1, to vertical position, shown in dotted lines. The dolly is provided with two outwardly projecting rigid trunnions 10, secured at their inner ends in bosses 11, rising from the upper surface of the frame 3. The trunnions are held rigidly in said bosses by set screws 12, projecting up from beneath, and the heads of which are hidden within the channel of the frame 3.

The rear and main portions of the skids 7 are relatively thin channel shaped bars, the web portions 13 being on the bottom to form smooth surfaces upon which to slide the device and its load. These rear portions are of uniform height and are long enough to extend back, preferably beyond the middle of the length of a casket 14 when the same is placed upon the skids with its forward end against the forward crossbar 8. This crossbar is provided with a series of rubber knobs 15, secured thereon and extending rearwardly and with which the adjacent end of the casket is placed in contact.

Figure 3:
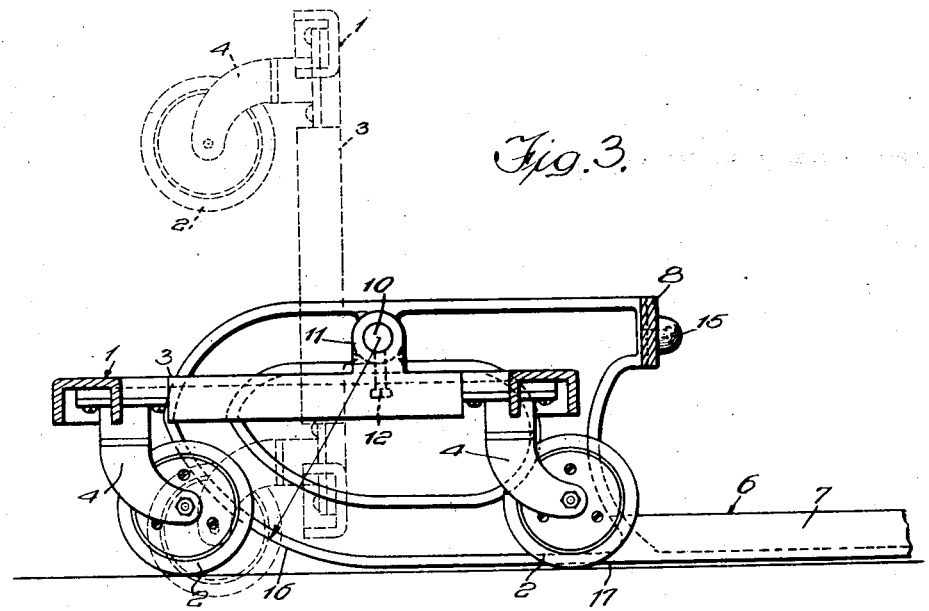
Figure 3, is a fragmentary vertical, longitudinal section on the line 3—3 of Figure 2.
Figure 4:
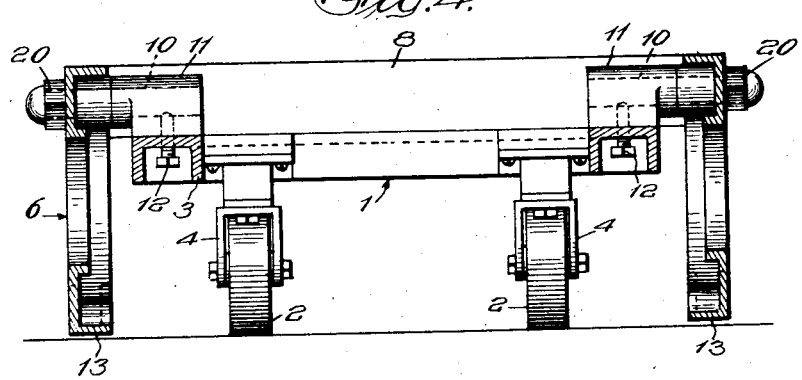
Figure 4, is a transverse vertical view on the line 4—4 of Figure 2.
Figure 5:
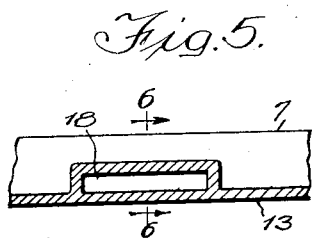
Figure 5, is a detail vertical, longitudinal sectional view on the line 5—5 of Figure 2.
Figure 6:
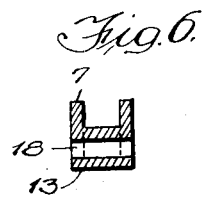
Figure 6, is a vertical, transverse section on the line 6—6 of Figure 5.

The forward ends of the skids are curved upwardly, as shown at 16, on a radius struck from the center line of the trunnions 10, and the lower surface 17 of the frame 6 is just slightly above the lower edges of the castor wheels, as best shown in Figure 3, and the curved forward ends 16 merge into the lower surfaces of the skids below the trunnions 10, consequently as the frame 6 is swung up to vertical position the curved surfaces 16 swing around close to the floor or to the plane of the lower surfaces of the castor wheels. The trunnions 10 are placed between the rear bar of the frame 3 and the middle thereof, and the proportions are such that when the frame 6 is raised to vertical position the skids extend up just at the rear of the rear bar of the frame 3 so that the load is well supported, in this position, by the dolly. Furthermore, the extension of the rear portion of the frame 3 from the trunnions 10 is slightly less than the distance of the trunnions from the floor, so that if necessary the dolly can be readily swung up to vertical position when the skids are horizontal and not interfere with the use of the skids as such. The skids 7 are provided with transverse slots 18 for receiving straps 19 by which the casket can be securely fastened to the skids.

In using the device the casket 14 is placed on the skids with one end against the rubber buffers 15 and it is secured by the straps 19.

Then by lifting up the opposite end of the casket the whole can be readily moved about on the castors 5 with the same ease as a trunk could be moved about upon a two wheeled truck. It will be clear that as the casket is swung upon the trunnions 10, as described, the curved parts 16 of the skids remain in close proximity to the floor.

Suppose it is desired to take a casket down a stairs from an upper floor, the proceeding is as above and the supported end of the casket is wheeled to the top of the stairs. As the forward castors reach the edge of the first step the man in advance can readily hold up the dolly until the weight is taken by the skids and then, as the length of the rear portion of the dolly is less than the distance from the trunnions to the bottom of the dolly, the dolly can be swung up to vertical position, as shown in dotted lines in Figure 3, and the casket can be slid down the stairs on the skids, the operator at the lower end of the casket holding the dolly up ready to take the weight of the casket, if it should be necessary, to end the casket up, as is frequently the case in moving a casket through narrow or winding passages.

Preferably the metal parts are made of aluminum, highly finished, and consequently the device, as a whole, is not heavy nor unsightly, but on the other hand it is of neat appearance and light in weight. The use of the device avoids the undesired and unpleasant situation now common when taking a casket down from an upper floor; it also tends to avoid the disfiguration of the casket and the walls and woodwork and the control of the casket is much more sure and certain when this improved device is used than when it is not.

For retaining the side parts of the skid frame on the trunnions, nuts 20 are screwed on the outer ends of the trunnions. Preferably for giving the device a neat finished appearance, the nuts 20 are what are termed cap nuts, that is, nuts which are closed over on their outer ends, as shown.

As many modifications of my invention will readily suggest themselves to one skilled in the art, I do not limit or confine my invention to the specific details of construction herein shown and described.

I claim:

1. A truck having castor wheels, a skid frame pivotally mounted at one end upon the truck, the frame having parts for the reception of an article to be moved by means of the device, skid surfaces on the skid frame, substantially in the normal plane of the lower surfaces of the truck wheels, said skid surfaces merging at their forward ends into support surfaces, made on arcs of circles having centers coincident with the centers of the frame pivots.

2. In a device of the kind described, a skid adapted to receive an article to be moved, such as a casket, means for temporarily securing a casket upon the skid, the skid having a raised part in front, provided with yielding bumpers for contact with the adjacent end of a casket, a truck upon which the front end of the skid is pivotally mounted, the truck adapted to be swung up on the pivots free of the floor upon which the skid is adapted to rest.

3. In a device of the kind described, a skid for sliding a heavy article down a stair, a truck pivotally mounted on the forward end of the skid and adapted to be aligned with the skid or swung to a position, at substantially right angles thereto, to facilitate the moving of a casket through narrow or winding halls and stairways.

4. A wheeled truck, a skid frame pivotally mounted at one end upon the truck, skid surfaces on the frame substantially in the plane of the lower surfaces of the truck wheels, the forward ends of said skid surfaces being curved upwardly and the truck being adapted to be swung up on the pivotal connection to a relatively vertical position.

5. In a device of the kind described, a supporting frame having skid surfaces, a truck having forward and rear wheels, the forward end of the frame pivotally mounted on the truck between the forward and rear wheels thereof, the skid surfaces on the frame extending forward of the rear wheels of the truck and merging at their forward ends into upwardly curved surfaces.

6. A device of the character described, comprising a skid adapted to receive and carry an article to be moved about, such as a casket, a wheeled dolly upon which the forward end of the skid is pivotally mounted adapting said skid to be swung from horizontal position to vertical position and back again while the casket is in place thereon.

7. A skid frame adapted to receive and support a casket or similar article, a wheeled truck upon which the forward end of the skid frame is pivotally mounted, the skid frame adapted to be swung up from a horizontal position, in which the weight is adapted to be supported directly by the skid frame to a vertical position, in which the weight is supported by the truck, and stops on the frame for contact with the casket, as and for the purpose specified.

8. In a device of the kind described, a four wheeled truck, a skid frame adapted to receive and support an article to be moved, such as a casket, said frame pivotally mounted at one end upon the truck and adapted to be lowered to horizontal position, substantially in contact with the surface upon which the truck stands, and also adapted to be swung up into vertical position relatively to the truck while the truck remains in contact with the supporting surface, and a stop on the frame against which the article contacts to prevent it sliding down the frame when same is swung up.

9. In a device of the kind described, a skid adapted to receive and support an article to be moved, such as a casket, a wheeled truck upon which the front end of the skid is pivotally mounted, the truck adapted to be readily swung up upon the pivotal connection substantially free of the floor upon which the skid rests while a casket is on the skid.

In testimony whereof, I have hereunto set my hand, this 14th day of September, 1925.

WILLIAM A. HALL.